United States Patent [19]

Frisbie

[11] Patent Number: 4,832,174
[45] Date of Patent: May 23, 1989

[54] INTEGRATED CIRCUIT SLEEVE HANDLER AND METHOD

[75] Inventor: Milo W. Frisbie, Mesa, Ariz.
[73] Assignee: Motorola Inc., Schaumburg, Ill.
[21] Appl. No.: 655,773
[22] Filed: Oct. 1, 1984
[51] Int. Cl.⁴ ............................................. B65G 47/24
[52] U.S. Cl. ................................... 198/384; 198/394; 198/395
[58] Field of Search ............... 198/394, 395, 384, 387, 198/408

[56] References Cited

U.S. PATENT DOCUMENTS 4,498,574  2/1985  Fischer ................ 198/394

FOREIGN PATENT DOCUMENTS 509017  9/1930  Fed. Rep. of Germany ...... 198/384
2499952  8/1982  France ................ 198/408

54-120170  9/1979  Japan ................ 198/394

Primary Examiner—Joseph E. Valenza
Assistant Examiner—K. Shane
Attorney, Agent, or Firm—Joe E. Barbee

[57] ABSTRACT

An integrated circuit sleeve handler and method includes a hopper for receiving a plurality of integrated circuit sleeves. A conveyor sequentially loads individual ones of the plurality of integrated circuit sleeves for transportation to a pair of opposed, orientation wheels. The orientation wheels orient the integrated circuit sleeves in accordance with their specific cross-sectional aspect, such as a longitudinal slot. An interface mechanism in conjunction with the conveyor receives the uniformly oriented integrated circuit sleeves for presentation to a subsequent handling station such as marking or testing equipment.

3 Claims, 2 Drawing Sheets

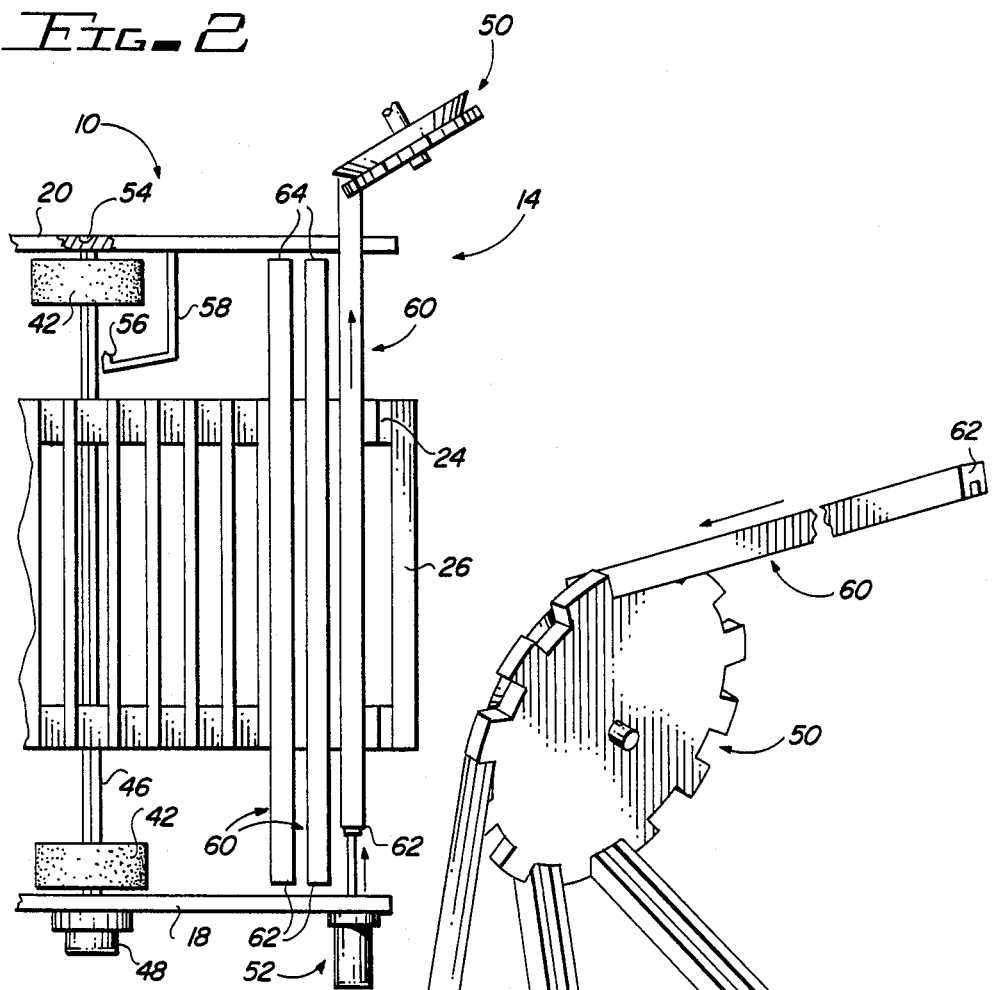
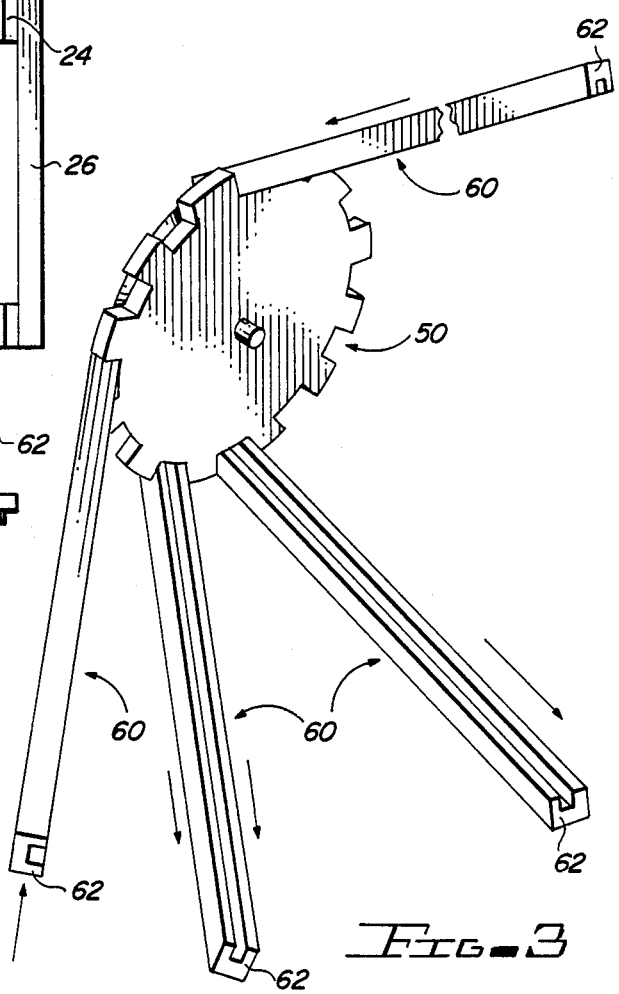
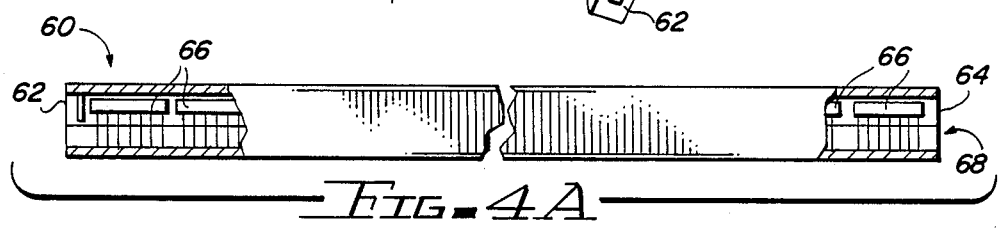

INTEGRATED CIRCUIT SLEEVE HANDLER AND METHOD

BACKGROUND OF THE INVENTION

The present invention relates, in general, to the field of elongate workpiece handlers and methods for uniformly orienting individual ones of a plurality of the workpieces in accordance with a specific cross-sectional aspect thereof. More particularly, the present invention relates to an integrated circuit sleeve handler and method for orienting and presenting integrated circuit sleeves to subsequent testing, or marking or other machinery in which a sleeve feed is used.

Presently, integrated circuit sleeves are manually loaded to testing and marking machinery. Due to the limitations inherent in this method, an individual operator must then be assigned to the individual testing or marking machine such that the operators attention is devoted fully to that single machine. For example, on a typical testing machine, an operator can supply approximately 24,000 integrated circuits per hour maximum. On existing laser marking machinery, the same 24,000 unit per hour maximum applies. Based upon a typical hourly wage of approximately $6,00 per hour, a single operator per testing or marking machine costs the manufacturer about $12,480.00 per year plus benefits which, considering four operators for four such machines, would result in a total cost of slightly less than $50,000 per year plus benefits. Therefore, a single operator on a single tester or laser marking machine utilizing the present manual loading of integrated circuit sleeves results in a unit labor cost of about $.25 per thousand units.

Therefore, it would be highly desirable to provide an automated method for inserting integrated circuit sleeves to subsequent testing and marking machinery. With such an automated sleeve handler, a single operator could be assigned to operate up to six such machines. Under such a scenario, a single operator could run tests on approximately 144,000 units per hour. Moreover, given the fact that existing laser marking equipment is operator limited at 24,000 units per hour, one operator could, by attending four typical laser marking machines, produce 160,000 units per hour inasmuch as the laser marker is capable of operating on four laser markers utilizing an automated sleeve handling system, the unit labor cost could be substantially reduced to a level of $.0375 per thousand units. Moreover, by eliminating the necessity for the other three operators for the additional equipment which may therefore be handled by a single operator, in excess of $37,000 per year may be saved in salary and benefits. This savings alone is significantly greater than the cost of such automated sleeve handling equipment.

SUMMARY OF THE INVENTION

It is therefore an object of the present invention to provide an improved integrated circuit sleeve handler and method.

It is further an object of the present invention to provide an improved integrated circuit sleeve handler and method which is readily and economically effectuated.

It is still further an object of the present invention to provide an improved integrated circuit sleeve handler and method which can reliably automate the loading of integrated circuit sleeves into testing or marking machinery.

It is still further an object of the present invention to provide an improved integrated circuit sleeve handler and method which correctly orients the individual sleeves for loading to a subsequent handling station and allows for the automated unloading and reloading of the sleeves with integrated circuits.

The foregoing and other objects are achieved in the present invention wherein there is provided an integrated circuit, or other workpiece, handler for sequential presentation to a subsequent handling station of uniformly oriented individual ones of a plurality of generally elongate workpieces having a specific cross-sectional aspect thereof. The handler includes a hopper for receiving the plurality of workpieces and a conveyor having input and output ends thereof, the input end in conjunction with the hopper for sequentially retrieving the individual ones of the plurality workpieces. An orientation mechanism in conjunction with the conveyor controllably orients the workpieces in accordance with the specific cross sectional aspect thereof. An interface mechanism in conjunction with the output end of the conveyor receives the uniformly oriented workpieces for presentation to the subsequent handling station.

In accordance with a method of the present invention, a method is provided for sequential presentation to a subsequent handling station of uniformly oriented individual ones of a plurality of generally elongate workpieces having a specific cross-sectional aspect thereof. The method includes the step of receiving the plurality of workpieces in a hopper and sequentially conveying the individual ones of the workpieces from the hopper to an orientation position and subsequent receiving position. The workpieces are thereafter controllably oriented at the orientation position in accordance with the specific cross-sectional aspect thereof whereupon the work pieces are conveyed from the orientation position to the receiving position. At the receiving position, the uniformly oriented workpieces are presented to the subsequent handling position.

In a specific embodiment of the present invention, a full box of integrated circuit sleeves is placed into a hopper whereupon the sleeves are thereafter manipulated automatically. The sleeves are firstly singulated by means of two belts which have paddles placed thereacross. The paddles are spaced so as to allow a single sleeve to fall in between them at any random orientation. The belts are indexed up an incline until the first sleeve reaches the orientation position. At this position, the sleeve is rotated to the desired orientation by means of four sponge type rollers; two rollers being located above the sleeve and two below. By rotating the rollers in the same direction, the sleeve is caused to roll. The sleeve continues this rolling operation until a photocell senses that the sleeve has reached the proper orientation. At this point, the index mechanism is activated to move the sleeve up the incline one more space, whereupon the above operation is repeated. Resultantly, the sleeves proceeding up the incline from the orientation position are all oriented in the same configuration. When these sleeves reach the upper position of the incline, they are transferred to an interface mechanism which interfaces the integrated circuit sleeve handler of the present invention to the testing, marking or subsequent handling machinery performing the desired process. When that process is completed, the integrated circuits are re-inserted into the sleeve and these units enter back into the interface mechanism containing the same sleeves from which the integrated circuits were removed. These sleeves are then refilled and ejected into a finished product bin ready for repackaging.

BRIEF DESCRIPTION OF THE DRAWINGS

The foregoing and other features and objects of the present invention and the manner of attaining them will become more apparent and the invention will be best understood by reference to the following description of a preferred embodiment taken in conjunction with the accompanying drawings, wherein:

FIG. 2 is a top plan view of the sleeve handler of FIGS. 1A and 1B illustrating the insertion of a sleeve or workpiece into an interface mechanism by means of an insertion mechanism;

FIG. 3 is a simplified detailed view of the interface mechanism for interfacing the sleeves or workpieces to a subsequent handling station, illustrating various positions of the sleeves thereon; and FIGS. 4A and 4B illustrate an integrated circuit sleeve containing a plurality of integrated circuit packages and showing a pinned and an opposite open end thereof.

DESCRIPTION OF A PREFERRED EMBODIMENT

Figure 1A:
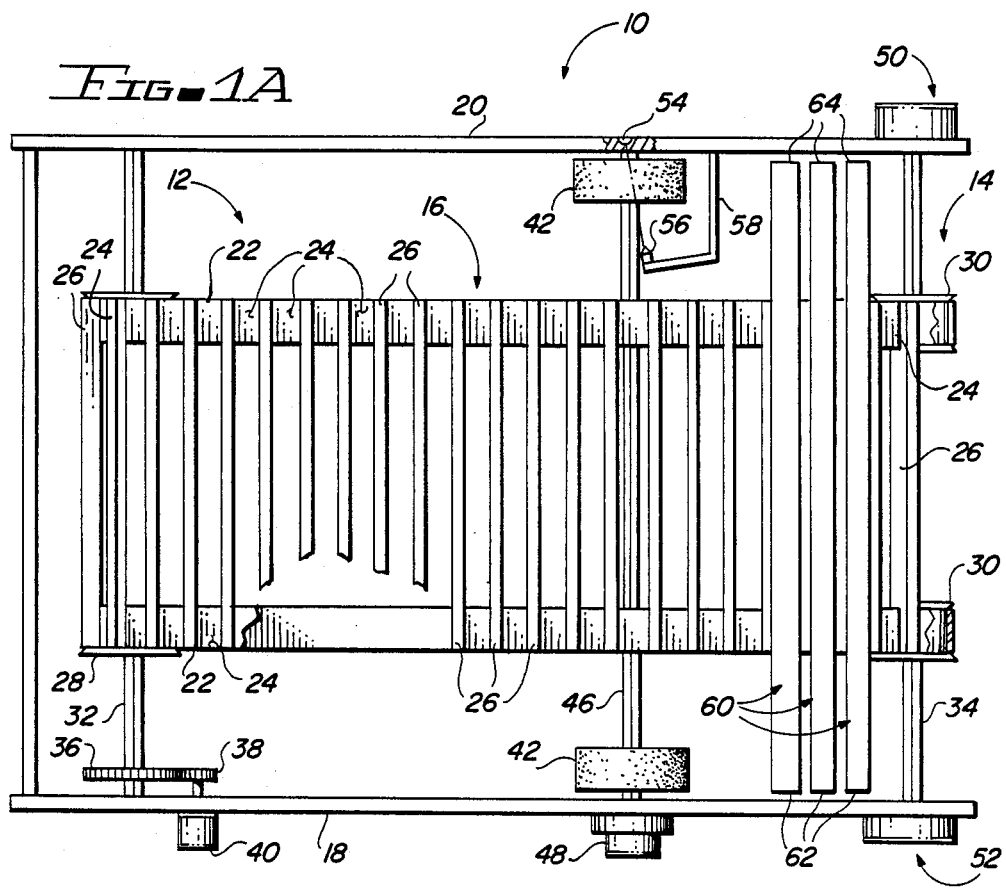
FIG. 1A is a top plan view of a workpiece or integrated circuit sleeve handler in accordance with the present invention illustrating the conveyor thereof and the photocell and light source adjacent the orientation wheels for correctly orienting the workpieces.
Figure 1B:
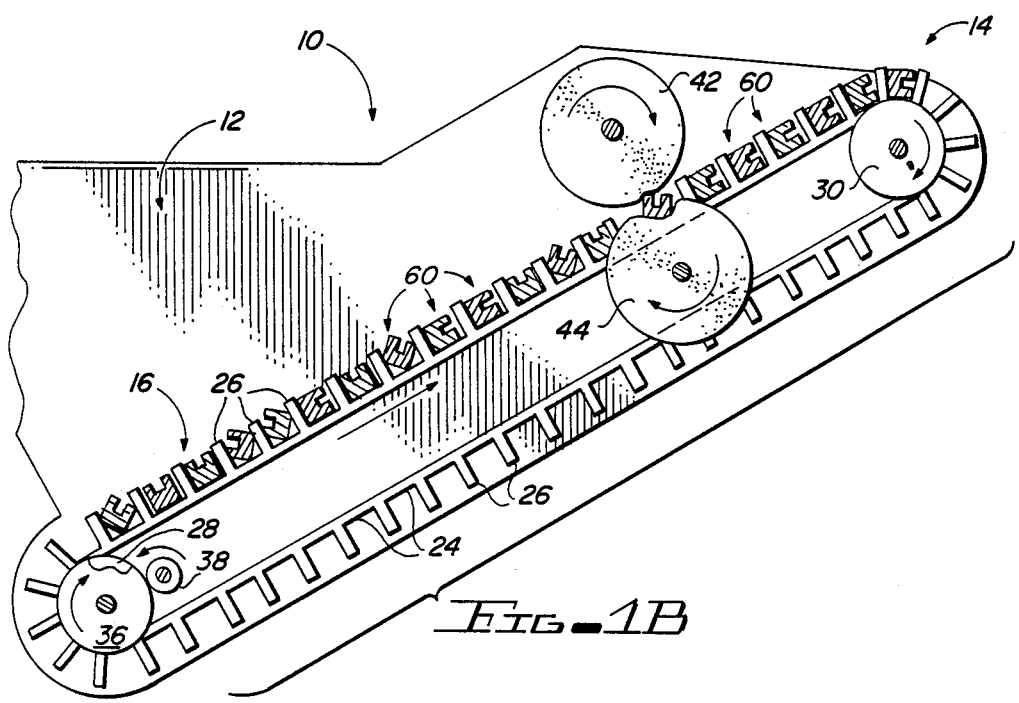
FIG. 1B is a cut-away, side plan view of the sleeve handler of FIG. 1A illustrates the conveyance of a plurality of work-pieces or sleeves in a random orientation to the upper and lower orientation wheels thereof for orienting the sleeves prior to their arrival at the presentation area.

With reference to FIGS. 1A and 1B, a sleeve handler 10 for use with integrated circuit sleeves or other generally elongate workpieces is shown. Sleeve handler 10 comprises, in pertinent part, hopper 12 for receiving a plurality of random oriented sleeves 60. Sleeve handler 10 includes a side 18 and opposite and generally parallel side 20 forming structural supports for the internal mechanism.

Conveyor 16 comprises a pair of generally parallel belts 22 having respective upper surfaces 24 thereof. A plurality of paddles 26 are affixed to upper surfaces 24 of belts 22 forming a plurality of interstitial spaces between paddles 26 for receiving individual ones of sleeves 60.

Belts 22 of conveyor 16 are driven by means of respective drive pulleys 28 concentrically surrounding index shaft 32. Index shaft 32 is driven by means of index shaft gear 36 which in turn, is driven by index motor gear 38 affixed to the shaft of index motor 40. Belts 22 are further guided by means of idler pulleys 30 concentrically surrounding idler shaft 34 at presentation area 14 of sleeve handler 10. As shown, an insertion mechanism 52 adjoins side 18 of sleeve handler 10 at presentation area 14. Additionally, an interface mechanism 50 for interfacing to a subsequent handling station adjoins side 20 of sleeve handler 10 at presentation area 14. Sleeves 60 include a pinned end 62 and opposite open end 64 for presentation to interface mechanism 50.

A pair of upper orientation wheels 42 engage sleeve 60 at an orientation position of sleeve handler 10. A corresponding pair of lower orientation wheels 44 similarly engage the lower portion of sleeves 60. Upper and lower orientation wheels 42, 44 concentrically surround, and are driven by respective orientation shafts 46. Orientation shafts 46 are driven by a pair of orientation motors 48 secured to side 18 of sleeve handler 10. Additionally, at the orientation position of sleeve handler 10 is also affixed photocell 54 at a level on side 20 at the interface of upper and lower orientation wheels 42, 44. A corresponding light source 56 is secured to side 20 by means of support 58 comprising a structural arm.

Referring additionally now to FIGS. 4A and 4B, a sleeve 60 containing a plurality of integrated circuit packages 66 is shown. As above described, sleeves 60 includes a pinned end 62 for retaining integrated circuit packages 66 within sleeve 60 as well as an opposite open end 64 through which integrated circuit packages 66 may be removed and inserted. In cross-section, sleeves 60 are generally "A" shaped including a longitudinal slot 68 thereby defining a specific cross-sectional aspect.

In operation, a full box of sleeves 60 having their pinned end 62 adjacent side 18 of sleeve handler 10 are loaded into hopper 12. Sleeves 60 then gravitationally fall into the interstitial spaces between paddles 26 on upper surfaces 24 of belts 22. At this point, sleeves 60 are in a random orientation with respect to their specific cross-sectional aspect. At this point, conveyor 16 is indexed by means of the activation of index motor 40 driving conveyor 16 in the direction indicated by the arrow shown toward presentation area 14. When a sleeve 60 reaches the orientation position, the orientation motors 48 are activated and the orientation of such sleeve 60 is sensed by means of photocell 54. This occurs, when the light from light source 56 aligns with longitudinal slot 68 of sleeve 60 properly oriented, index motor 40 continues to drive conveyor 16. However, if sleeve 60 is not oriented, upper and lower orientation wheels 42, 44 turn until the photocell is irradiated. At this point, index motor 40 is reactivated presenting an additional sleeve 60 to the orientation position. After several cycles, properly oriented sleeves 60 reach presentation area 14. At this point, such sleeve 60 is ready to be transferred by insertion mechanism 52 to interface mechanism 50.

Referring additionally now to FIGS. 2 and 3, a sleeve 60 at presentation area 14, is shown. When one of sleeves 60 reaches presentation area 14 a switching mechanism activates insertion mechanism 52, shown as a solenoid, to push sleeve 60 longitudinally into engagement with interface mechanism 50 shown as a wheel having peripheral notches thereof for engaging sleeve 60 at open end 64 thereof. It should be noted, that while insertion mechanism 52 is shown as a solenoid, a motor driven cam would likewise serve to insert sleeve 60 into interface mechanism 50.

A sleeve 60 at presentation area 14 is engaged to interface mechanism 50 at the nine o'clock position thereof with pinned end 62 extending radially therefrom at an acute angle with respect to the plane of interface mechanism 50. Interface mechanism 50 then rotates through 90° such that sleeve 60 is in the twelve o'clock position whereupon integrated circuit packages 66 will slide from sleeve 60. At this position, interface mechanism 50 inserts integrated circuit packages 66 into a subsequent handling station such as a testing or marking machine. Empty sleeves 60 retained within interface mechanism 50 are then further indexed an additional 180° to the six o'clock position shown whereupon integrated circuit packages 66 having been tested, marked or otherwise handled are reinserted into the empty sleeve. An additional 30° rotation of interface mechanism 50 brings the refilled sleeve 60 to a position whereupon sleeve 60 would be ejected from interface mechanism 50 for deposit in a finished product bin.

In the embodiment above described, sleeve handler 10 may comprise any of a number of well known structural materials suitable in the construction of such machinery upper and lower orientation wheels 42, 44 may be conveniently furnished as conventional sponge or foam rubber or other resiliently conformational soft and pliable materials which function to grip sleeves 60 such that a proper orientation may be attained.

What has been provided therefore is an improved integrated circuit sleeve handler and method which is readily and economically effectuated. The improved integrated circuit sleeve handler and method of the present invention can reliably automate the loading of integrated circuit sleeves into testing or marking machinery and correctly orients the individual sleeves for loading to a subsequent handling station while allowing for the automated unloading and reloading of the sleeves with integrated circuits. It should be appreciated, that the improved integrated circuit sleeve handler and method of the present invention eliminates the need for an operator to hand dump sleeves at every testing or marking machine and allows a single operator to run several machines. Therefore, the machines can provide more production througput than is currently possible due to these operator limiting factors. Moreover, the subsequent handling machines can continue to produce product without an operator present.

While there have been described above the principles of the present invention in conjunction with specific apparatus, it is to be clearly understood that the foregoing description is made only by way of example and not as limitation to the scope of the present invention.

I claim:

1. A workpiece handler for sequential presentation to a subsequent handling station of uniformly oriented individual ones of a plurality of generally elongate workpieces having a specific cross-sectional aspect thereof comprising:
   a hopper for receiving said plurality of workpieces;
   conveyor means having input and output ends thereof, said input end in conjunction with said hopper for retreiving said individual ones of said plurality of workpieces, said output end for sequential presentation to said subsequent handling station of said uniformally oriented individual ones of said workpieces, said conveyor means comprising a plurality of interstitial spaces each adapted to hold one or said workpieces;
   orientation means located between said input and output ends of said conveyor means for positively engaging each said workpiece and checking for proper orientation, rotating each said workpiece, which is mis-oriented, about a longitudinal axis thereof while maintaining said mis-oriented workpiece in its interstitial space of said conveyor means and stopping said rotation when said mis-oriented workpiece is in a desired orientation with respect to said specific cross-sectional aspect thereof; and
   interface means in conjunction with said output end of said conveyor means for receiving said uniformly oriented workpieces for presentation to the subsequent handling station.

2. The workpiece handler of claim 1 whererin said orientation means comprises:
   at least one pair of opposed compliant wheels arranged to positively engage at least one end of each said workpiece therebetween; and
   an optical alignment sensor comprising a light source and a light detector arranged so that a workpiece engaged by said compliant wheels prevents light from said source from reaching said sensor unless said workpiece is in said desired orientation.

3. A method for sequential presentation to a subsequent handling station of uniformly oriented individual ones of a plurality of generally elongate workpieces having a specific cross-sectional aspect thereof comprising the steps of:
   receiving said plurality of workpieces in a hopper;
   sequentially conveying individual ones of said workpieces from said hopper by means of a conveyor comprising a plurality of paddles having interstitial spaces therebetween;
   sequentially positively engaging each said individual one of said plurality of workpieces at an orientation position intermediate between said hopper and said subsequent handling station with an orientation means while leaving said workpieces in said interstitial spaces of said conveyor;
   operating said orientation means to rotate said individual ones of said plurality of workpieces about the longitudunal axes thereof until a desired orientation is achieved, said workpieces remaining in said interstitial spaces during said rotation;
   conveying said workpieces from said orientation position by means of said conveyor; and
   presenting said uniformly oriented workpieces to said subsequent handling station.

* * * * *